United States Patent [19]
Walles et al.

[11] Patent Number: 5,521,998
[45] Date of Patent: May 28, 1996

[54] STRAIN RELIEF BACKSHELL FOR FIBER OPTIC TRANSMISSION LINES

[75] Inventors: Gerard G. Walles, Sandy Hook; Ronald J. Caron, Newtown; James A. Bleakney, Torrington; Gerald W. Parkinson, Shelton; Christopher W. DeWitt, East Haven, all of Conn.

[73] Assignee: United Technologies Corporation, Hartford, Conn.

[21] Appl. No.: 354,991

[22] Filed: Dec. 13, 1994

[51] Int. Cl.$^6$ ............................................. G02B 6/36
[52] U.S. Cl. ............................................. 385/86; 385/138
[58] Field of Search ............................ 385/86, 59, 71, 385/62, 81, 87, 134, 138, 139, 25, 26

[56] References Cited

U.S. PATENT DOCUMENTS

| | | | |
|---|---|---|---|
| 4,373,777 | 2/1983 | Borsuk et al. | 385/139 |
| 5,113,475 | 5/1992 | Baker | 385/138 |
| 5,436,993 | 7/1995 | Antonini et al. | 385/59 |

*Primary Examiner*—John Ngo
*Attorney, Agent, or Firm*—William W. Jones

[57] ABSTRACT

A connecting assembly interconnects one fiber optic cable harness to another fiber optic cable harness, or to an electronic unit containing an optical transmitter or receiver. The backshell includes a coupling ring that prevents loosening of the connection without first relaxing tension on the individual fiber optic cables in the cable harness. The inability to rotate the connector end coupling ring before relaxing tension on the fiber optic cables prevents damage to the individual fiber optic cables from occurring when the backshell is rotated with respect to the connector.

5 Claims, 1 Drawing Sheet

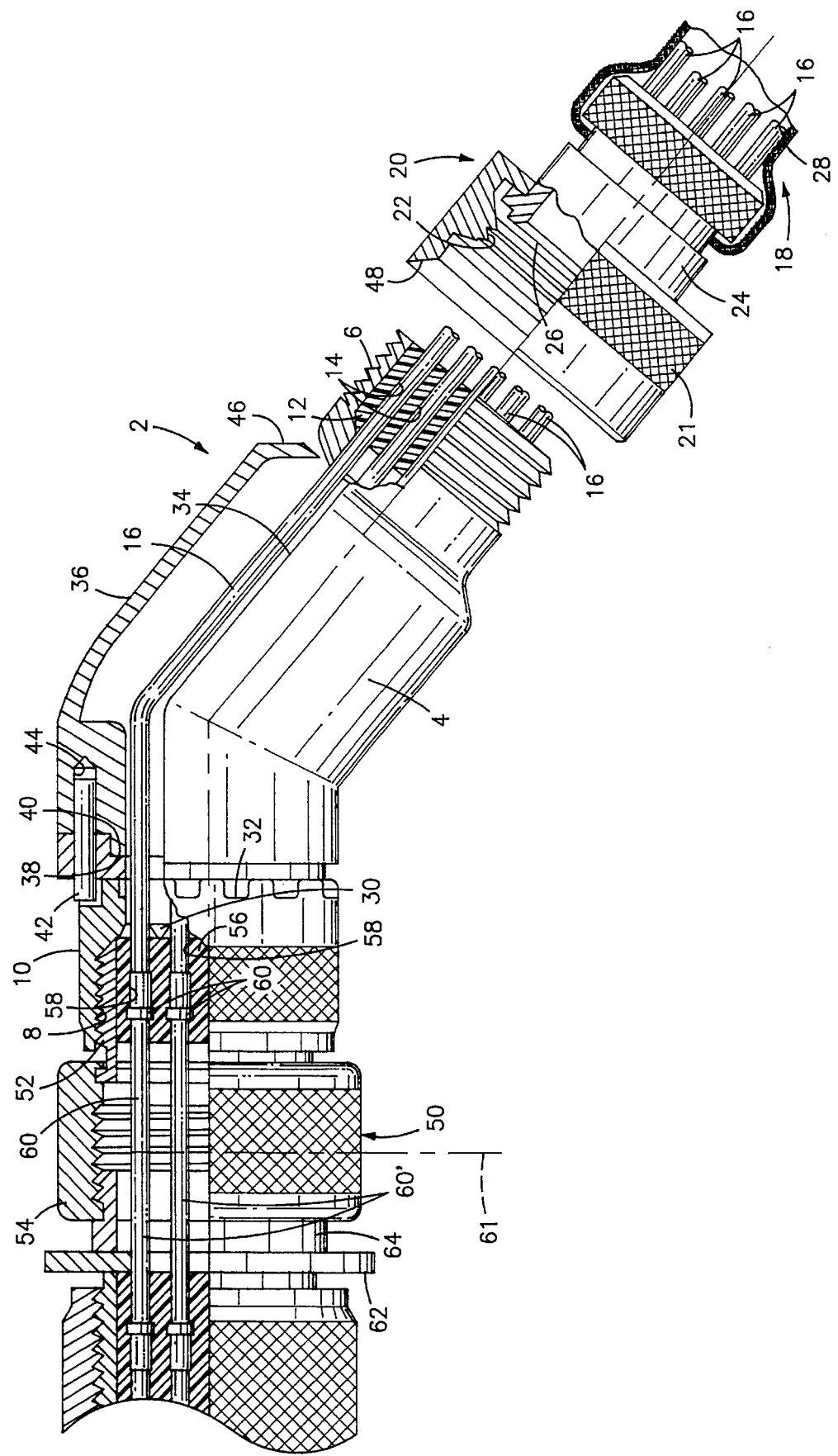

5,521,998

STRAIN RELIEF BACKSHELL FOR FIBER OPTIC TRANSMISSION LINES

TECHNICAL FIELD

This invention relates to an improved fiber optic strain relief backshell which provides protection against damage to the individual fiber optic cables when the backshell is disassembled or otherwise handled.

BACKGROUND ART

Fiber optic cable harnesses consist of a plurality of individual fiber optic cables of indeterminate length which are bundled together. Interconnections between adjacent cable harnesses are made by connector assemblies which consist of multi-contact, separable connectors and their strain relief adapters, which are commonly referred to as "backshells." The backshells include protective housings through which the fiber optic cables are passed, so that a terminus end of each fiber optic cable is precisely positioned at one end of the connector and properly aligned for abutment with a corresponding fiber optic cable in a mating connector of another cable harness, or of an instrument which uses transmissions from the fiber optic cables. The connector's threaded interconnecting joint is used to properly position the adjoining fiber optic cable ends relative to each other. The individual cables are restrained against longitudinal movement relative to the connection and relative to the respective cables to which they are interconnected. The aforesaid cable restraint is provided by an elastomeric grommet which is compressed within the cable entry end of the backshell. The individual fiber optic cables are threaded through individual passages in the grommet. When the cable end coupling ring portion of the backshell is tightened, the grommet is compressed so as to grip and restrain each of the fiber optic cables against longitudinal movement. Thus in each backshell the grommet will grip the fiber optic cables at a location spaced from their cut ends.

The aforesaid connector assembly system is similar to that used to interconnect conventional electrical cables, and has proven to be quite serviceable with conventional electrical cables. A problem, however, arises when the aforesaid connector assembly is used with fiber optic harnesses due to the fragile nature of fiber optic cables. The problem resides in the fact that the end of the backshell that contains the free ends of the individual fiber optic cables can be intentionally or accidentally rotated without loosening the grommet which grips the individual fiber optic cables. Such rotation is typically attempted in order to align the cables with the intended direction of the harness routing. The result is that the fiber optic cables will be restrained against longitudinal movement at a location distal of their free ends, and will be twisted at their free ends. This imparts a longitudinal displacement and a resultant stress on the fiber optic cables which can break them or damage their connections. Obviously, breakage of any of the individual fiber optic cables and connection damage are undesirable, and will result in system malfunctions.

DISCLOSURE OF THE INVENTION

This invention relates to a backshell assembly for interconnecting fiber optic wire harnesses wherein the probability that fiber optic cables can be broken within the assembly due to rotation of one end of the backshell is substantially reduced. The backshell assembly of this invention thus provides a more stable and reliable means for interconnecting adjacent fiber optic cable harnesses which can withstand rough handling without causing internal disruption of cable transmissions.

The backshell assembly of this invention includes a conventional elastomeric grommet which is enclosed in a coupling ring at the distal wire harness-end of the backshell, and a threaded connector-end coupling ring. The backshell employs an anti-rotation detent which prevents the connector-end coupling ring from being rotated until the distal-end coupling ring has been loosened to relax the compressive forces imposed on the distal end grommet, thereby freeing the individual fiber optic cables for unrestrained longitudinal movement relative to the connector assembly. Once the distal end coupling ring has been backed away from the distal end grommet, so as to relax the compression thereof, the anti-rotational detent device on the connector coupling ring can be disabled, and the connector end coupling ring can be rotated to adjust its angular orientation. The relaxation of compression on the distal end grommet permits individual fiber optic cables to move longitudinally as the inter-fiber optic cable connection is rotated, thereby preventing the fiber optic cables from breaking, and also ensuring that the position of the cut ends of the cables remain stable in the connector.

It is therefore an object of this invention to provide a fiber optic cable harness backshell which will stabilize the fiber optic cables within the backshell.

It is an additional object of this invention to provide a backshell of the character described which will reduce the chance of cable breakage within the backshell if its angular orientation is altered with respect to the fiber optic connector.

BRIEF DESCRIPTION OF THE DRAWING

These and other objects and advantages of this invention will become more readily apparent from the following detailed description of a preferred embodiment thereof when taken in conjunction with the accompanying drawing which is a side elevational view, taken partially in section, of a backshell and connector assembly formed in accordance with this invention.

BEST MODE FOR CARRYING OUT THE INVENTION

Referring now to the drawing, there is shown a fiber optic cable harness backshell which is denoted generally by the numeral 2. The connector assembly 2 includes a protective housing 4 which has opposite threaded ends 6 and 8. The end 6 will be referred to as the harness end, and the end 8 will be referred to as the connector end. The connector end 8 of the housing 4 includes a coupling ring 10 which is rotatably mounted on the housing 4.

The harness end 6 of the housing 4 includes an elastomeric grommet 12 which is press fitted therein. The grommet 12 has a plurality of passages 14 which extend therethrough. The individual fiber optic cables 16 in the cable harness 18 extend through a distal end cable harness coupling assembly 20 and are individually threaded through the grommet passages 14 into the housing 4. The coupling assembly 20 includes a rotatable ring 21 with internal threads 22 which can be threaded onto the cable harness end 6 of the housing 4. The coupling assembly 20 also includes a fixed sleeve 24 on which the ring 21 is mounted, and which includes an annular flange 26 which is operable to compress the grommet 12 when the ring 21 is tightened down onto the end 6 of the housing 4. When the grommet 12 is thus compressed, the passages 14 will tightly grip the individual fiber optic cables 16 to prevent them from moving longitudinally relative to the housing 4. The cable harness 18 includes a protective boot 28 that is secured to the sleeve portion 24 of the coupling assembly 20. The boot prevents the imposition of sharp bends on the fiber optic cables as they exit the backshell.

The connector end coupling ring 10 is rotatably mounted on the housing 4 and includes internal threads 8 and set of annular projecting teeth 30. The coupling ring 10 includes a series of spaced-apart notches 32 which face the housing 4. The housing 4 is formed with an inspection port 34 which allows one to properly position the fiber optic cables 16 inside of the housing 4, and to visually inspect the interior of the housing 4 whenever necessary. The inspection port 34 is closed by a removable cover plate 36. The cover plate 36 is properly positioned on the housing 4 by means of a lug 38 which is pivoted into a slot 40. A detent pin 42 is fitted into a bore 44 formed in the cover plate 36. The pin 42 projects beyond the end of the cover plate 36 and extends into one of the notches 32 on the connector end coupling ring 10 so that the latter cannot be turned when the cover plate 36 is mounted on the housing 4. The notches 32 are uniformly spaced at close intervals around the circumference of the coupling ring 10 so that the connector backshell assembly 2 can be oriented at whatever angle will best align the cables 16 with the intended harness routing. The cover plate 36 includes an inwardly tapered edge 46 which is overlain by a complementarily tapered face 48 on the cable harness coupling ring 21 when the ring 21 is fully screwed onto the threaded end 6 of the housing 4. Thus the cover plate 36 will be firmly held in place on the housing 4.

A fiber optic connector 50 includes an externally threaded housing 52 and an internally threaded ring component 54, the components 52 and 54 being rotatably connected to each other. The connector 50 has an integral elastomeric grommet 56 press fitted therein. The grommet 56 is conventionally referred to as the "connector" grommet, and has through passages 58 into which the fiber optic cables 16 extend. The individual cables 16 are permanently attached to a respective individual fiber optic terminus 60, which terminus 60 facilitates attachment of the fiber optic cables 16 to the connector 50. The fiber optic termini 60 are pressed into the connector 50 and are operable to lock the individual cables 16 into the grommet 56 so that the cables 16 will be fixed against longitudinal movement relative to the grommet 56. The transmission connection is made between the termini 60 and a mating array of fiber optic termini 60' inside of the ring component 54 where the ends of the termini 60 and 60' abut in a plane 61 (shown in phantom). The termini 60' are mounted in a fiber optic receptacle 62 which has an externally threaded housing 64 onto which the ring component 54 is screwed. The assembly 2 is put together by threading the ring assembly 54 onto the housing 64 to bring the fiber optic termini 60 and 60' into proper abutment. Alignment of integral keys on the housing 52 of connector 50 with mating keyways in the housing 64 will assure that the termini of the mating connectors are properly aligned.

The connector backshell 10 is threaded onto the ring 52. When the connector end coupling ring 10 has been tightened down onto the ring 52, the cover plate 36 is fitted onto the housing 4 and the detent pin 42 is inserted into an aligned notch 32 on the connector end coupling ring 10. When the cover plate 36 is pivoted down to close the inspection port 34, the cable harness coupling ring 21 is then tightened onto the threaded end 6 of the housing 4 so as to bring the tapered surface 48 on on the ring 21 into overlapping contact with the tapered surface 46 on the cover plate 36. When the coupling ring 21 has been tightened onto the housing 4 sufficiently to clamp the cover plate 36 onto the housing 4, the cable harness grommet 12 will be compressed by the coupling flange 26 so that the grommet 12 will grip the cables 16 firmly. The assembly 2 will thus firmly hold the cables 16 against longitudinal movement, so as to preserve the integrity of the signal transmission contact between the cables 16 and the termini 60.

Once the aforesaid signal transmission contact has been established, the assembly 2 prevents the cable-to-termini attachment from being disrupted by accidental or intentional rotation of the connector coupling ring 10. The detent pin 42 prevents the connector coupling ring 10 from being rotated so long as the cover plate 36 remains in place on the housing 4. Since the cover plate 36 can only be moved if the cable harness coupling ring 21 is backed off of the housing 4, the assembly 2 ensures that the cables 16 will be released from the grip of the cable harness grommet 12, by reason of decompression thereof, before the connector coupling ring 10 can be moved. When the connector coupling ring 10 is thus freed for rotation, any incidental twisting of the cables 16 which results as the coupling ring 10 is rotated will not result in deleterious longitudinal or torsional tensioning of the cables 16 due to the fact that the cables 16, while secured to the connector termini 60, will be free to move within the distal end cable harness grommet 12 because of the release of compression of the latter. Thus, the cables 16 and their connections to the termini 60 will not be damaged by rotational movement of the backshell 2.

It will be readily appreciated that the fiber optic cable backshell assembly of this invention will significantly reduce the occurrence of damage to the fiber optic cables and their signal connections which might occur as a result of accidental or intentional rotation of the backshell.

Since many changes and variations of the disclosed embodiment of the invention may be made without departing from the inventive concept, it is not intended to limit the invention otherwise than as required by the appended claims.

What is claimed is:

1. A combination of a connector assembly, fiber optic cables and a cable harness; said connector assembly securing fiber optic cables in said cable harness to a complementary fiber optic signal transmission receptor device, said connector assembly comprising:

a) a backshell housing through which the fiber optic cables pass, said backshell housing including a distal end adjacent to the cable harness and a connector end adjacent to the receptor device;

b) a first elastomeric grommet disposed in said distal end of said backshell housing, said first grommet including a plurality of openings through which the fiber optic cables extend;

c) a first coupling ring mounted on said connector end of said backshell housing, said first coupling ring providing means for connecting said backshell housing to the receptor device;

d) a second coupling ring mounted on the cable harness, said second coupling ring providing means for connecting the cable harness to said distal end of said backshell housing, said second coupling ring including means for compressing said first grommet when said second coupling ring is tightened onto said backshell housing so as to cause said first grommet to tightly grip each of the fiber optic cables and prevent longitudinal movement of the fiber optic cables; and e) detent means mounted on said backshell housing, said detent means being operative to prevent movement of said first coupling ring while said first grommet is compressed thereby preventing stressing of said fiber optic cables resulting from rotation of said second coupling ring.

2. The connector assembly of claim 1 wherein said backshell housing includes an inspection port opening into an interior fiber optic cable-containing portion of the backshell housing, and a cover removably mounted on the backshell housing for selectively closing the inspection port.

3. The connector assembly of claim 2 wherein said detent means is mounted on said inspection port cover.

4. The connector assembly of claim 3 wherein said detent means comprises a pin mounted on said inspection port cover, and wherein said first coupling ring includes a plurality of notches spaced circumferentially about an edge of said first coupling ring, said pin projecting from said inspection port cover into a selected one of said first coupling ring notches.

5. The connector assembly of claim 3 wherein said inspection port cover includes an edge disposed at the distal end of said backshell housing, and wherein said second coupling ring overlaps said edge of said inspection port cover when the second coupling ring is tightened onto said backshell housing.

* * * * *